United States Patent
Ritter et al.

(10) Patent No.: US 6,766,704 B2
(45) Date of Patent: Jul. 27, 2004

(54) ACTUATING SYSTEM

(75) Inventors: Andreas Ritter, Hilgert (DE); Rolf Mintgen, Thür (DE)

(73) Assignee: Stabilus GmbH, Koblenz (DE)

( * ) Notice: Subject to any disclaimer, the term of this patent is extended or adjusted under 35 U.S.C. 154(b) by 0 days.

(21) Appl. No.: 09/923,485

(22) Filed: Aug. 7, 2001

(65) Prior Publication Data

US 2002/0023312 A1 Feb. 28, 2002

(30) Foreign Application Priority Data

Aug. 10, 2000 (DE) .......................................... 100 38 972

(51) Int. Cl.[7] .............................................. F16H 27/02
(52) U.S. Cl. ............................. 74/25; 74/22 A; 74/607; 74/89.16; 74/89
(58) Field of Search ........................... 74/22 R, 22 A, 74/23, 24, 25, 118, 607, 89.16, 89; 16/221, 233

(56) References Cited

U.S. PATENT DOCUMENTS

| | | | | |
|---|---|---|---|---|
| 963,557 A | * | 7/1910 | Hill ............................... 74/390 |
| 2,739,657 A | * | 3/1956 | Clifford ....................... 180/6.2 |
| 3,862,672 A | * | 1/1975 | Tappen et al. .............. 184/6.12 |
| 4,123,040 A | * | 10/1978 | Kuzarov ....................... 254/342 |
| 4,180,222 A | * | 12/1979 | Thornburg .................... 74/22 R |
| 4,215,587 A | * | 8/1980 | Kisovec ........................ 74/22 R |
| 4,278,381 A | * | 7/1981 | Blomquist et al. ........... 414/349 |
| 4,490,088 A | * | 12/1984 | Castle .......................... 414/457 |
| 4,547,944 A | * | 10/1985 | Hayden .................... 29/402.09 |
| 5,085,063 A | * | 2/1992 | Van Dyke et al. ............ 70/218 |
| 5,186,079 A | * | 2/1993 | Gee .............................. 74/607 |
| 5,203,231 A | * | 4/1993 | Minegishi et al. ........ 74/606 R |
| 5,522,246 A | * | 6/1996 | Simon .......................... 72/260 |
| 6,189,413 B1 | * | 2/2001 | Morse et al. ................. 74/607 |

FOREIGN PATENT DOCUMENTS

DE        40 36 900        5/1992

* cited by examiner

Primary Examiner—William C. Joyce
Assistant Examiner—Colby Hansen
(74) Attorney, Agent, or Firm—Cohen, Pontani, Lieberman & Pavane

(57) ABSTRACT

Actuating system comprising an actuator with a torque-transmission element for a movable element, in particular a swing-action panel in a motor vehicle, the movable element being mounted pivotably in a basic hinge element. The actuating system has a torque support arranged functionally between the basic hinge element and the actuator, at least one key profile being made in the torque support, so that it is possible to bring about axial plug-connection assembly with the basic hinge element.

7 Claims, 1 Drawing Sheet

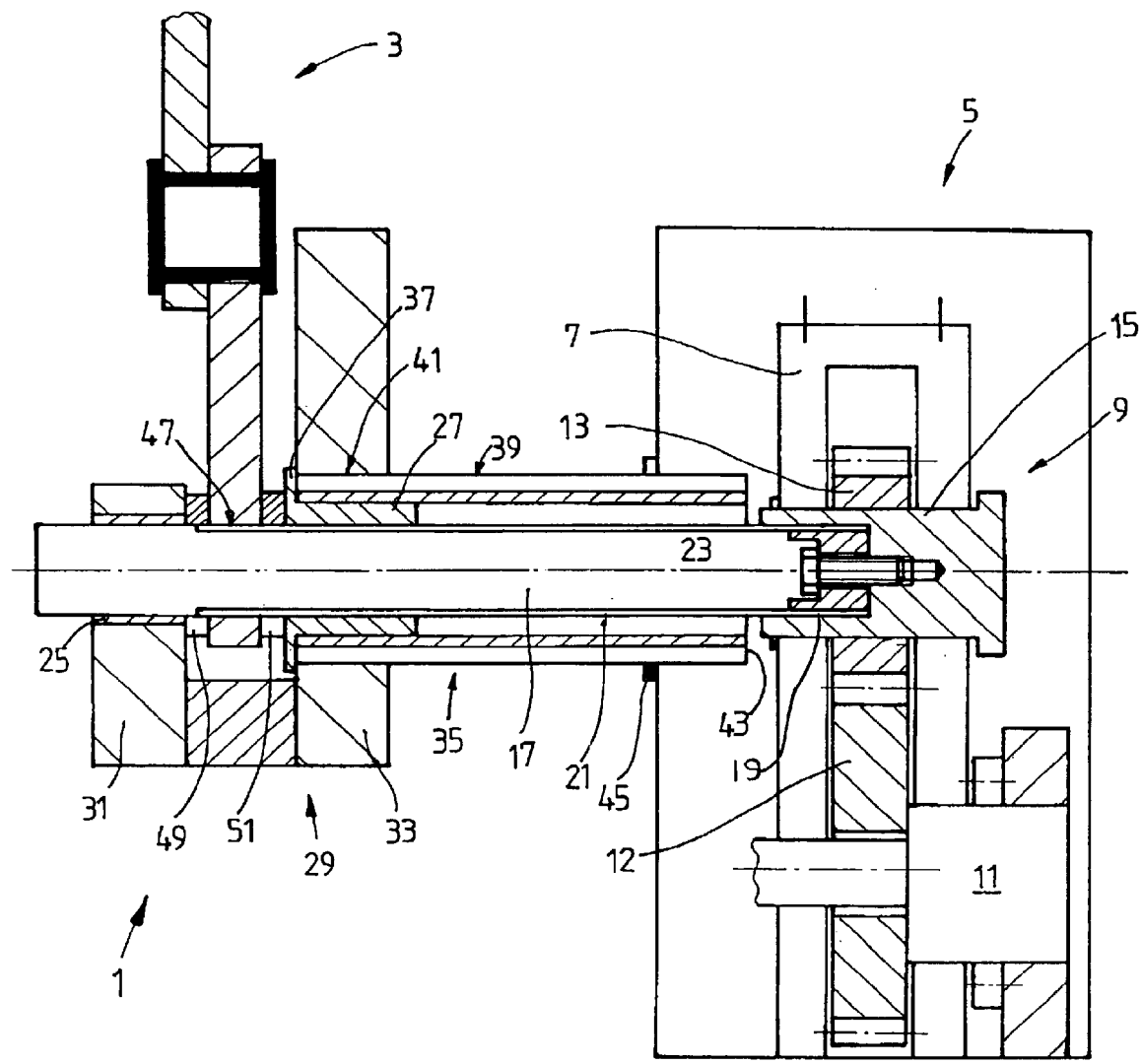

ACTUATING SYSTEM

BACKGROUND OF THE INVENTION

1. Field of the Invention

The invention relates to an actuating system including an actuator with a torque-transmission element for a movable element, in particular a swing-action panel in a motor vehicle, the movable element being pivotably mounted in a basic hinge element.

2. Description of the Related Art

DE 40 36 900 A1 describes an actuating system for swing-action panels which comprises, inter alias, an actuator and a hinge-joint system. The actuator, in turn, comprises an electric motor and an intermediate gear mechanism. The actuating system has available to it an installation part which serves for fastening the actuator and a basic hinge element. The installation part may be preassembled outside the vehicle so as to reduce the installation outlay directly in or on the vehicle. This measure is based, in part, on the poorly accessible installation space in the vehicle. It is necessary to ensure not just that a sufficient amount of installation space is necessary for the components, but also that there is accessibility for screwing tools. One way of solving this difficulty is by using the installation part disclosed in DE 40 36 900 A1.

SUMMARY OF THE INVENTION

The object of the present invention is to realize an actuating system which can be installed even in the case of very constricted space conditions.

The object is achieved according to the invention in that the actuating system has a torque support arranged functionally between the basic hinge element and the actuator, at least one key profile being made in the torque support, with the result that it is possible to bring about axial plug-connection assembly with the basic hinge element.

The essential advantage is that all that is required in a narrow installation space is a straightforward axial installation movement on the basic hinge element. It is irrelevant here whether the actuator is connected to the basic hinge element or the basic hinge element is connected to the actuator, and it should be pointed out that it is not necessary for there to be any direct contact between the two above-mentioned subassemblies. An intermediate gear mechanism is conceivable, as is a housing, on which the actuator and the torque support may be supported.

According to a preferred embodiment, the torque support is formed by a hollow crossmember which accommodates the torque-transmission element. This means that the torque support additionally performs a shielding function for the torque-transmission element. Dirt and moisture are kept away. Furthermore, the risk of accident is reduced.

In respect of installation being as straightforward as possible and of low surface pressure, which in turn allows the use of favorable materials, the torque support has a multi-key profile or a spline profile.

It is also provided that the basic hinge element has a mounting for the torque support, the mounting having a mating profile in relation to the key profile of the torque support. It is thus possible for the torque support to be pushed in axially in each case both on the actuator side and on the basic hinge element. High-outlay screw fastening can be dispensed with. If the key profiles can be made identically at both ends of the torque support, then it is also possible to use a torque support which is profiled over the entire length and can easily be produced, for example, by massive forming.

In order that the production outlay on the basic hinge element is as low as possible, the basic hinge element has a retaining plate in which the mounting with the mating profile is made in a through-passage opening for the torque support. The through-passage opening either may be produced by broaching or, in the case of a relatively thin retaining plate, may also be punched.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not necessarily drawn to scale and that, unless otherwise indicated, they are merely intended to conceptually illustrate the structures and procedures described herein.

BRIEF DESCRIPTION OF THE DRAWINGS

The sole FIGURE is a cross-section of the actuating system according to the invention.

DETAILED DESCRIPTION OF THE PRESENTLY PREFERRED EMBODIMENTS

The single FIGURE shows part of an actuating system 1 for a movable element 3, in particular a swing-action panel on a motor vehicle. A framework 7 for a single-stage gear mechanism 9 is configured in a housing 5. An actuator 11 drives a first gearwheel 12 which, in turn, is in engagement with a second gearwheel 13. The second gearwheel 13 has a bearing 15 for accommodating a torque-transmission element 17. The bearing 15 has a mating profile 19 which is in operative connection with a key profile 21 of the torque-transmission element. A fastening bolt 23, which can be fitted axially, secures the torque-transmission element 17 in the bearing 15.

The torque-transmission element 17 is mounted in a basic hinge element 29 via a first bushing 25 and a second bushing 27. Two spaced-apart retaining plates 31; 33 accommodate respective bushings 25; 27. The second bushing 27 bears a torque support 35, which is configured as a hollow crossmember and accommodates the torque-transmission element 17 in its interior. Furthermore, the second bushing 27 has a flange 37, which fixes the second bushing 27 axially in relation to the basic hinge element 29. The flange 37 constitutes a stop for the torque support 35, which is plugged into the housing 5 at its other end, the torque support 35 having a key profile 39. The retaining plate 33 likewise has a mating profile 41 in relation to the key profile 39 of the torque support. In the case of a retaining plate made of sheet metal, the mating profile 41 may be punched into a through-passage opening. As can be seen, the torque support 35 is made with a key profile 39 over its entire length.

It is possible to conceive of two installation situations in principle. It is possible for the basic hinge element 29 or the housing 5 to be fastened on a bodywork or any other desired stationary part in relation to the movable element 3.

Irrespective of these two options, the torque support 35 is introduced, by way of its key profile 39, into one retaining plate 33. Thereafter, the second bushing 27 is installed. Finally, the first bushing 25 is introduced into the other retaining plate 31, and the two retaining plates 31, 33 constitute the first structural unit of the basic hinge element 29.

As the second structural unit, the framework 7 is assembled with the two gearwheels 12; 13 and the actuator 11. For the case where the second structure unit is fastened on the bodywork, the first structural unit is introduced axially into the housing 5 by way of the torque support 35. The key profile 39 on the torque support 35 engages in a corresponding mating profile of the housing 5 until the torque support butts against a stop surface 43 of the housing 5. As an alternative to the stop surface, a securing ring 45, for example, may be used for axial fixing.

Thereafter, the torque-transmission element 17 is introduced into the first bushing 25. The movable element 3 or a transmission lever of the movable element is moved between the two retaining plates 31; 33 by way of its bearing 47. The torque-transmission element 17 engages through the bearing 47 until its end side comes into abutment in the bearing location 15 of the second gearwheel 13. The key profile 21 of the element 17 is in keyed engagement with the bearing 47, so that relative rotation is prevented. The hollow torque-transmission element 17 is secured by means of the fastening bolt 23. As an alternative, a retaining ring may be arranged between the second gearwheel 13 and the torque-transmission element 17. It is then possible to use a torque-transmission element with a solid cross section. End-side abutment is then likewise superfluous. Two spacer rings 49; 51 are fitted between the two retaining plates 31; 33 and the movable element 3. It is possible either to use radially slit rings or to fit the spacer rings on during the installation movement of the torque-transmission element 17. As a result, the torque transmission element 17, the torque support 35 and the basic hinge element 29 are secured axially.

If the basic hinge element 29 is fastened on the bodywork, then the housing 5 is pushed, with the gear mechanism 9 and the actuator 11, onto the torque support 35. Thereafter, the torque-transmission element 17 is introduced into the housing 5 through the torque support 35 until it butts against the second gearwheel 13.

The gear mechanism may be regarded as being optional. If required, the gear mechanism is dispensed with and the torque-transmission element is pushed into a functionally identical mount of the actuator.

If the actuator 11 subjects the first gearwheel 12 to a drive torque, it is supported on the framework of the gear mechanism. The two gearwheels 12; 13 are likewise retained by the framework 5 and transfer the initial torque to the torque-transmission element 17. The torque-transmission element 17 pivots the movable element 3. At the same time, the basic hinge element 29 is supported on the housing 5 via the torque support 35, the housing, in turn, being connected to the framework 7. This realizes a rigid connection between the basic hinge element 29 and the actuator 11. It is also possible for the torque support 35 to be fastened on the framework 7 and, if appropriate, for a housing 5 to be dispensed with.

Thus, while there have shown and described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

We claim:

1. An actuating system for a movable element, said actuating system comprising:
    a basic hinge element comprising a mounting and a movable element which is pivotably mounted with respect to said mounting, said mounting having a mating profile;
    a torque transmission element which is received in said basic hinge element and fixed against rotation with respect to said movable element for pivoting said movable element with respect to said mounting;
    a housing;
    an actuator which is fixed in said housing for transmitting torque to said torque transmission element; and
    a torque support which is fixed against rotation with respect to said housing and with respect to said mounting of said basic hinge element, said torque support having a key profile which can be plugged into said mating profile of said mounting so that the torque support cannot rotate with respect to said mounting.

2. An actuating system as in claim 1 wherein said torque support comprises a hollow member which receives said torque transmission element through said hollow member.

3. An actuating system as in claim 1 wherein said mounting consists of a retaining plate having a through passage which forms said mating profile.

4. An actuating system as in claim 1 wherein said housing has a mating profile, said key profile on said torque support engaging in said mating profile of said housing so that the torque support cannot rotate with respect to said housing.

5. An actuating system as in claim 1 wherein said torque transmission element comprises a key profile which engages in a mating profile of said movable element.

6. An actuating system as in claim 1 wherein said housing comprises a framework in which a bearing having a mating profile is journaled, said torque transmission element comprising a key profile which can be plugged into said mating profile of said bearing to fix said torque transmission element against rotation with respect to said bearing, said bearing being arranged to transmit torque from said actuator.

7. An actuating system as in claim 6 further comprising a first gearwheel driven by said actuator and a second gearwheel fixed on said bearing, said first gearwheel being in driving engagement with said second gearwheel.

* * * * *